Patented Dec. 16, 1930

1,785,242

UNITED STATES PATENT OFFICE

ARMAN E. BECKER, OF NEWARK, AND REGINALD G. SLOANE, OF ELIZABETH, NEW JERSEY, ASSIGNORS TO STANDARD OIL DEVELOPMENT COMPANY, A CORPORATION OF DELAWARE

PROCESS OF RECLAIMING RESIDUES

No Drawing.   Application filed November 28, 1923.   Serial No. 677,513.

This invention relates to the working up of residues left from the distillation of certain petroleum materials, and will be fully understood from the following description.

Where petroleum oils which contain organic acids, such as naphthenic acids, are distilled with soda, for instance in the rerunning of lubricating fractions over caustic soda, there remains in the bottom of the still a dense residue which has heretofore been regarded as useless waste material, or at least fit only for a fuel. We have found, however, that useful products can be derived from this material, and in proceeding in accordance with out invention we reduce or thin it and then proceed to separate out the main products. The thinning may be accomplished, for example by addition of several volumes of naphtha. The material is now washed thoroughly with water. Where water of ordinary temperature is used, as much as 25 to 30 volumes may be successively used. The water dissolves out soluble organic acid compounds which, for instance in the case of the caustic soda bottoms, are largely sodium naphthenates, and these products are recovered from the wash water by suitable means, as by salting out or other desired method, and can be used for the preparation of desired greases, etc. The residual oil is treated with strong sulphuric acid, for instance a treat of 40 to 50 lbs. of 66° Bé. acid per barrel of oily residue. After agitating, settling, sludging and neutralizing, as with a caustic soda solution, and washing, as customary in the regular treatment of lubricating oils, the naphtha is removed by distillation and the oil obtained is then ready for use.

In some cases it is desirable to first thin the still residue by means of introduced steam, this being supplied in such quantities as to afford up to 5 volumes of condensation water, and as the steam and condensation water works through the material the water-soluble organic compounds, for instance naphthenates, are readily dissolved out and removed with such wash water and can be recovered as above mentioned. This steaming has the advantage of both thinning the residue and at the same time dissolving the soluble compounds in hot water. It is then desirable to drive off residual water by externally applied heat, say up to a temperature of 500° F., and naphtha to the extent of 2 or 3 volumes is added to maintain the oil sufficiently thin for satisfactory subsequent treating. Sulphuric acid, for instance 40 to 50 lbs. of 66° Bé. acid per barrel of the oil residue, is then introduced and after agitation, sludge separation and neutralization and washing, as customary in refining lubricating oils, the naphtha is driven off, as by distillation, and the oil product is ready for use.

An oil product as produced by our method shows for example the following inspection record, gravity 18.9° Bé., flash 320° F., viscosity at 212° F. 182, pour 20° F., and is of a type of product well suited for heavy duty usage.

Instead of naphtha for maintaining the oil thin, kerosene or other distillate or organic solvent may be used, and such equivalents are to be understood in connection therewith.

What we claim is:

1. The process of working up residues left from distillation of petroleum oils with caustic soda, which comprises thinning the residue with naphtha, washing with water and recovering naphthenates from the wash water, treating the residue while in the presence of naphtha with 66° Bé. sulphuric acid at the rate of about 50 lbs. to the barrel, settling and removing sludge, treating with caustic soda solution, washing, and distilling off naphtha.

2. Process for recovering the heavy fluid residue resulting from the distillation of petroleum containing organic acid compounds over caustic soda, which comprises thinning the residue with a relatively low boiling thinning agent, bringing the thinned residue into intimate contact with water to dissolve said compounds, removing water containing the compounds in solution, refining the thinned residue with sulfuric acid and removing the thinning agents therefrom.

3. Process according to claim 2 in which the thinning agent is a relatively low boiling hydrocarbon oil.

ARMAN E. BECKER.
REGINALD G. SLOANE.